United States Patent [19]
Mensinger et al.

[11] Patent Number: 5,876,677
[45] Date of Patent: Mar. 2, 1999

[54] ULTRASOUND-ASSISTED LIQUID REDOX ABSORBER

[76] Inventors: Michael C. Mensinger, 1021 69th St.;
Amirali G. Rehmat, 1413 Darien Club Dr., both of Darien, Ill. 60561; Dennis Leppin, 195 N. Harbor Dr., Chicago, Ill. 60601

[21] Appl. No.: 637,525

[22] Filed: Apr. 25, 1996

[51] Int. Cl.$^6$ ................................................. B01D 53/14
[52] U.S. Cl. .................... 422/112; 134/169 R; 210/748; 422/128; 422/168
[58] Field of Search .................. 95/20, 29, 151, 95/189, 195, 197, 235; 134/1, 56 R, 104.1, 166 R, 169 R; 210/748; 422/128, 168, 112

[56] References Cited

U.S. PATENT DOCUMENTS

| | | | |
|---|---|---|---|
| 2,909,239 | 10/1959 | Bennett | 183/61 |
| 3,025,793 | 3/1962 | Vischulis | 134/1 |
| 3,073,097 | 1/1963 | Hallett et al. | 55/283 |
| 3,172,744 | 3/1965 | Fortman et al. | 55/263 |
| 3,175,567 | 3/1965 | Crawford | 134/1 |
| 3,481,784 | 12/1969 | Karpovich | 134/1 |
| 3,685,257 | 8/1972 | Burke | 55/96 |
| 3,873,071 | 3/1975 | Tatebe | 134/184 |
| 3,893,833 | 7/1975 | Ulvestad | 55/273 |
| 3,976,453 | 8/1976 | Brown | 55/222 |
| 4,036,597 | 7/1977 | Filss | 23/284 |
| 4,500,326 | 2/1985 | Sunter | 55/21 |
| 4,716,829 | 1/1988 | Wenzel | 134/1 |
| 4,744,964 | 5/1988 | Kühl | 423/230 |
| 5,298,161 | 3/1994 | Sieg | 210/427 |

*Primary Examiner*—Peter A. Hruskoci
*Attorney, Agent, or Firm*—Dick and Harris

[57] ABSTRACT

A method and apparatus for removing sulfur from gas streams, utilizing liquid redox, including an improved method for preventing build-up of elemental sulfur in a sulfur absorber. Ultrasonic irradiation of one or more portions of the structure of the absorber prevents sulfur build-up. In combination with monitoring of the pressure across the absorber, the freeing of sulfur from surfaces in an absorber can be automatically actuated.

2 Claims, 1 Drawing Sheet

ULTRASOUND-ASSISTED LIQUID REDOX ABSORBER

BACKGROUND OF THE INVENTION

1. Field of the Invention

The present invention relates generally to liquid redox processes for the removal of sulfur from gases, such as natural gas, or from tail gases from a sulfur plant.

2. The Prior Art

Hydrogen sulfide ($H_2S$) is often encountered in gas streams, such as natural gas being extracted from the ground, or in gases being produced, either intentionally or unintentionally in various industrial processes, such as the tail gas from Claus sulfur plants. In the presence of oxygen, hydrogen sulfide can form various oxides which are not only pollutants (which can contribute to acid rain formation), but also which can be corrosive or otherwise damaging to equipment, such as pipelines and other machinery.

Processes for the removal of hydrogen sulfide from gas streams are known. A basic agent such as an amine absorbent, may be employed, in which case the amine is regenerated for reuse as an absorbent by heat, for example, by steam. A variety of non-regenerable processes using iron-based solids, liquid-based processes using caustic triazine have also been employed. For economic reasons, the regenerable processes such as those that employ amines and liquid oxidation-reduction (redox) solutions are more attractive as the total amount of sulfur that must be removed increases, to the range of 50–100 pounds per day. When conversion to elemental sulfur is desired for environmental or regulatory reasons, liquid redox processes are preferred when total sulfur that must be removed from the gas stream is on the order of 10 tons per day.

Generally, in a typical liquid redox process, an oxidation-reduction system is used in which the hydrogen sulfide-laden gas ("sour" gas) is exposed to a sulfide precipitation catalyst material (for example, a metal oxide, in which the metal cation changes from a higher valence state to a lower state, upon reaction with the hydrogen sulfide), and the gas, now with a substantially reduced level of hydrogen sulfide ("sweet" gas) is then piped onward to its intended destination.

After passing through the absorber, at least a portion of the sulfur will have precipitated out of the precipitation catalyst solution as elemental sulfur. The precipitation catalyst solution is then sent to some form of regeneration apparatus, such as an oxidizer, for restoration of the metal cation in the precipitation catalyst solution to the desired higher valence state, so that the solution may be returned to the absorber to absorb more hydrogen sulfide from the gas stream.

Such liquid redox processes are favored since they operate at ambient temperatures and have high selectivity for hydrogen sulfide. While one of the major attributes of liquid redox processes for removing hydrogen sulfide from sub-quality natural gas is the rapid reaction rate of the hydrogen sulfide with the liquid redox solution and the subsequent precipitation of elemental sulfur, the process is marred by the tendency of the elemental sulfur to deposit on internal surfaces of the absorber such as walls, static mixers, packing and so on. The tendency for sulfur deposition primarily emanates from the fact that there is always a zone of stagnant fluid associated with a fixed surface. That is, a thin "boundary layer" of non-moving liquid is present on non-moving surfaces. As a result, the sulfur precipitating from the liquid onto the non-moving surfaces is essentially continuous and eventually clogs the absorber. The absorber must then be taken out of service and cleaned, resulting in plant downtime and economic penalty to the user. One method which has been considered to keep such surfaces free of sulfur deposits would be to maintain a large flow of recirculated liquid through the absorber with turbulence to ensure continuous scrubbing of the stagnant zones within the absorber. Such a method would not have a high degree of certainty in achieving uniform turbulence throughout the absorber. In addition, such a method could be costly in terms of the additional amounts of absorbent which must be maintained in the circulation loop, and the energy and equipment costs associated with constant circulation and turbulence.

It would therefore be desirable to provide a method for assuring the prevention of buildup of elemental sulfur on non-moving surfaces within an absorber, without having to resort to continuous circulation of absorbent within the absorber.

SUMMARY OF THE INVENTION

The present invention is a process, for use in association with processes for causing the precipitation of a material which has been dissolved into a liquid solution, out of the liquid solution within a vessel, through which the liquid solution is being passed and in which the precipitation occurs and which vessel contains surfaces in its interior onto which precipitated material could build-up, for precluding build-up of the precipitated material in solid form on surfaces within the vessel, toward prevention of blockage within the vessel which blockage could prevent the passing of the liquid solution through the vessel.

The process comprises the steps of:

operably positioning in physical contact, a source of ultrasonic irradiation, at least indirectly, to the vessel, so that when the source of ultrasonic irradiation is actuated, precipitated material which has accumulated onto surfaces within the vessel is driven off of the respective surfaces and into a suspended state within the solution; and actuating, at least intermittently, the source of ultrasonic irradiation, when solution bearing the dissolved material, is being passed, towards maintaining the precipitated material in a suspended state in the solution.

In a preferred embodiment of the invention, the step of actuating, at least intermittently, the source of ultrasonic irradiation, further comprises the steps of:

positioning a differential pressure sensing apparatus in operable association with the vessel, such that when build-up of precipitated material within the vessel causes an increase in the pressure differential across the vessel, the increase in differential pressure can be quantifiably sensed; and actuating the source of ultrasonic irradiation when the sensed increase in differential pressure across the vessel has a value which is in excess of a preselected value.

The invention also comprises an apparatus, for use in association with apparatus for causing the precipitation of a material which has been dissolved into a liquid solution, out of the liquid solution within a vessel, through which the liquid solution is being passed and in which the precipitation occurs and which vessel contains surfaces in its interior onto which precipitated material could build-up, for precluding build-up of the precipitated material in solid form on surfaces within the vessel, toward prevention of blockage within the vessel which blockage could prevent the passing of the liquid solution through the vessel.

In particular, the apparatus comprises a source of ultrasonic irradiation, operably positioned in physical contact, at least indirectly, to the vessel, so that when the source of ultrasonic irradiation is actuated, precipitated material which has accumulated onto surfaces within the vessel is driven off of the respective surfaces and into a suspended state within the solution; and means for actuating, at least intermittently, the source of ultrasonic irradiation, when solution bearing the dissolved material, is being passed, towards maintaining the precipitated material in a suspended state in the solution.

Preferably, the means for actuating, at least intermittently, the source of ultrasonic irradiation, further comprise a differential pressure sensing apparatus, positioned in operable association with the vessel, such that when build-up of precipitated material within the vessel causes an increase in the pressure differential across the vessel, the increase in differential pressure can be quantifiably sensed; and means for actuating the source of ultrasonic irradiation when the sensed increase in differential pressure across the vessel has a value which is in excess of a preselected value.

It is believed that the mechanism by which the ultrasonic irradiation serves to dislodge the precipitated material is that the ultrasonic waves will cause cavitation in the liquid, the force of which is believed to result in a jetting action on the surfaces as the microbubbles in the liquid collapse. The precipitated material will thereby be scrubbed from the surfaces within the vessel, and returned to suspension within the liquid.

BEST MODE FOR CARRYING OUT THE INVENTION

Figure 1:
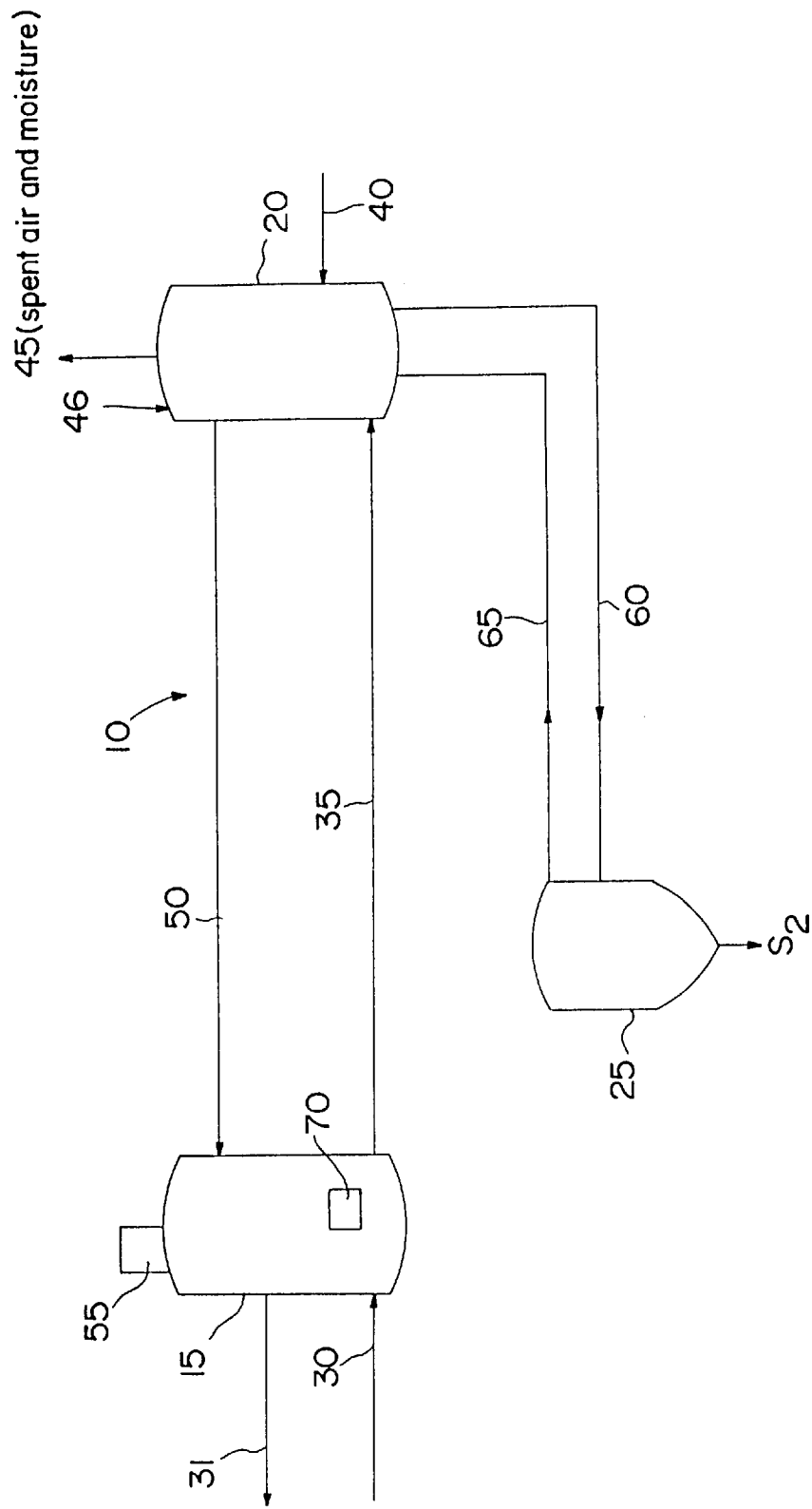
FIG. 1 is a schematic illustration of a liquid redox process, illustrating the application of the present invention.

While this invention is susceptible of embodiment in many different forms, there is shown in the drawing and will be described herein in detail, a specific embodiment, with the understanding that the present invention is to be considered as an exemplification of the principles of the invention, and is not intended to limit the invention to the embodiment illustrated.

FIG. 1 illustrates schematically a simplified liquid redox hydrogen sulfide removal system. System 10 includes absorber 15, oxidizer or regenerator 20, sulfur remover 25. In general, sour gas containing hydrogen sulfide is introduced into absorber 15 at entrance 30. After a certain residence time in absorber 15, the hydrogen sulfide in the gas interacts with the absorbent agent in the absorber 15, which may be any one of a number of known absorbent agents, such as one bearing iron cations. As a result of the interaction, elemental sulfur particles precipitate out of the solution, and the metal cation is converted to a metal hydride.

Exhausted solution is sent to an oxidizer 20, via line 35. Into oxidizer 20, an oxidizing agent, typically air or other oxygen-bearing gas, is introduced into the oxidizer at 40 and brought into contact with the exhausted solution. As a result of the reaction, the metal hydride is converted into water, which is removed with the spent air as moisture at 45, and metal cations (e.g., $Fe^{2+}$). The restored absorbent catalyst is then returned to the absorber via line 50. Fresh absorbent must be periodically added to the system, such as at 46, since some solution is lost with the sulfur removed at 25.

The precipitated sulfur is drained off from oxidizer 20 along with some solution, and sent via 60 to separator 25, where the sulfur may be separated in molten form, or as a filter cake. The solution is then typically returned to the oxidizer, such as via 65.

After the gas, which has been introduced at 30, has been cleaned of hydrogen sulfide, the "sweet" gas exits the absorber, e.g., at 31.

In a preferred embodiment of the invention, the absorber and oxidizer may be of otherwise conventional configuration, having the usual internal packing structures, static mixers, etc., as are known in the art. A source of ultrasonic irradiation 55 is mounted to absorber 15 at such a position, depending upon the physical construction of the particular absorber, so that the irradiation will be communicated to the liquid within the vessel. It is believed that the ultrasonic irradiation will cause cavitation to occur in the liquid, creating numerous microbubbles, creating a jetting or scrubbing action, as the microbubbles collapse. Any sulfur material which has settled on the packing or the static mixer, or both, is thus driven off and returned to a suspended state in the liquid. Periodic activation of the ultrasonic source will thus be effective to prevent buildup of sulfur material upon surfaces within the vessel. Accordingly, the accumulation of sulfur and eventual plugging of the absorber can be prevented, reducing the frequency with which the absorber must be taken off line.

A differential pressure indicator 70 is provided on absorber 15, so as to provide an indication of pressure drop across the absorber, such as between the points of introduction of regenerated absorbent agent, and the exit of exhausted absorbent to the oxidizer. The operation of the ultrasonic source 55 preferably may be coordinated with the pressure indicator 70, such that when the pressure drop reaches a predetermined value, which may be arbitrarily or empirically selected by the operator, indicating a certain level of development of sulfur deposition on surfaces in the absorber, the ultrasonic source 55 is activated. Ultrasonic treatment is continued, until the pressure indicator 70 indicates that the pressure drop across the absorber has fallen to a predetermined lower value which corresponds to a relatively sulfur-free condition of the surfaces within the absorber. Such cycling will continue as needed to keep the absorber free and clear of sulfur deposits, thereby maximizing the amount of time that the absorber stays onstream and running effectively.

It is also believed that the application of ultrasonic irradiation to an absorber enhances the reaction rate between the sulfur-bearing gas and the absorbent. Such an enhancement results, it is believed, from improved mass transfer between the gas and the liquid due to ultrasonic microstreaming, and from a reaction rate increase due to ultrasonic cavitation. This enhancement can result in a decrease in the size of the absorber which is required, or a decrease in the rate of circulation of liquid redox solution, or possibly both, which in either situation results in improved efficiency and thus economic benefit to the process.

The foregoing description and drawing merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. An ultrasound-assisted absorber, for use in a liquid redox absorber-regenerator system for removing a first chemical material from a gaseous stream, while a gaseous stream containing the first chemical material, is passed through the absorber, the ultrasound-assisted absorber comprising:

an absorber vessel: means for introducing gas containing a first chemical material into said absorber vessel, means for introducing absorbent solution containing a second chemical material which is capable of reacting with the first chemical material to cause a third chemical material to precipitate out of the absorbent solution, while the absorbent solution is in the absorber vessel, means for enabling an used absorbent solution to be returned to a source of absorbent solution for regeneration thereof, and means for removing clean gas from said absorber vessel;

a source of ultrasonic irradiation, operably positioned in physical contact, at least indirectly, to the absorber vessel, so that when the source of ultrasonic irradiation is actuated, precipitated material which has accumulated onto surfaces within the absorber vessel is driven off of the respective surfaces and into a suspended state within the absorbent solution; and means for actuating, at least intermittently, the source of ultrasonic irradiation, while absorbent solution bearing the dissolved material, is being passed through the vessel, towards maintaining the precipitated material in a suspended state in the solution present in the vessel.

2. The apparatus according to claim 1, wherein the means for actuating, at least intermittently, the source of ultrasonic irradiation, further comprise:

a differential pressure sensing apparatus, positioned in operable association with the absorber vessel, such that when build-up of precipitated material within the absorber vessel causes an increase in the pressure differential across the absorber vessel, the increase in differential pressure can be quantifiably sensed; and means for actuating the source of ultrasonic irradiation when the sensed increase in differential pressure across the absorber vessel has a value which is in excess of a preselected value.

* * * * *